March 17, 1931.  C. E. BUNKER  1,796,503
RAT OR MOUSE TRAP
Filed March 19, 1929
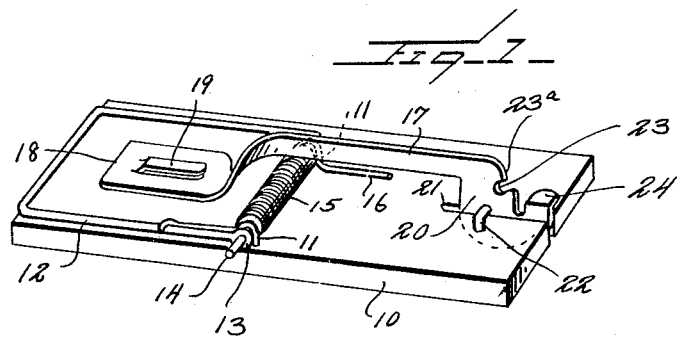
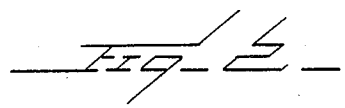
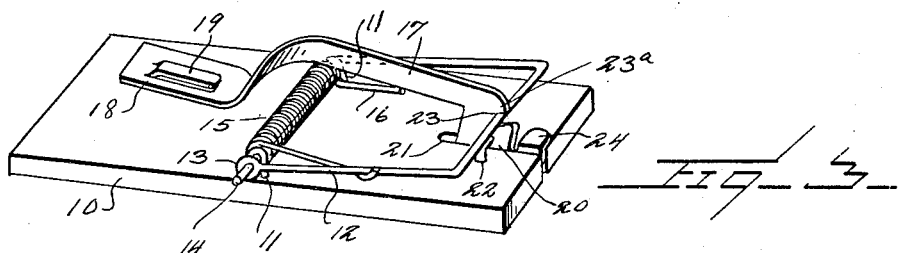
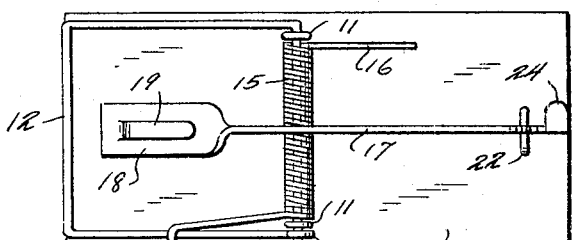
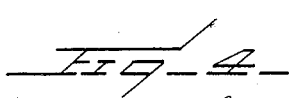
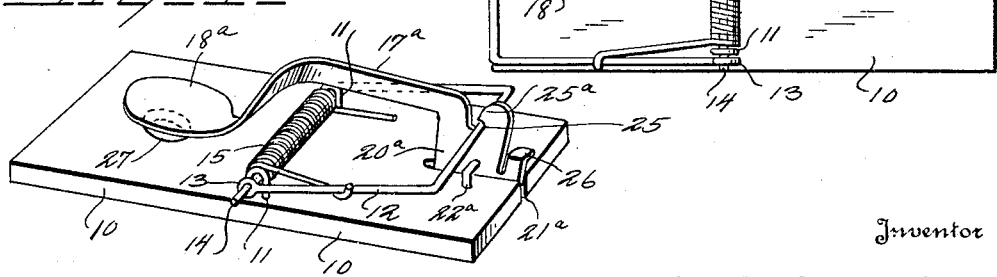
Inventor
C. E. Bunker
By Watson E. Coleman
Attorney Patented Mar. 17, 1931

1,796,503

UNITED STATES PATENT OFFICE

CAREY E. BUNKER, OF OREGON, MISSOURI

RAT OR MOUSE TRAP

Application filed March 19, 1929. Serial No. 348,244.

This invention relates to traps and particularly to traps of that character in which a base is provided having a striking member held in a retracted position by a latch, the latch being connected to a trip which, when released, permits the striking member to turn through an arc of about one hundred and eighty degrees and strike the animal and break its back or otherwise kill it or trap it.

One of the objects of the present invention is to so construct a trap of this character that the trap may be readily set and the striking member will be positively held in this set position until tripped without any danger of accidental dislodgments.

A further object is to provide a device of this character having a latch connected to a bait holder or bait cover so that when the animal attempts to get the bait, the latch will be released and the striker will operate.

Other objects will appear in the course of the following description.

My invention is illustrated in the accompanying drawing, wherein:—

Figures 1 and 2 are perspective views of a trap embodying the improvements of my invention, the parts being shown in sprung and set position respectively;

Figure 3 is a top plan view of the device as illustrated in Figure 1;

Figure 4 is a perspective view of a modified form hereinbefore specifically referred to.

Referring to Figures 1 to 3, 10 designates the base which is preferably rectangular and may be made of wood or other suitable material. Disposed upon the face of this base are the staples 11. The striker 12 or jaw as it may be termed of the trap is generally rectagular in form and is made of wire. The striker is bent to form an eye 13 in one end, the wire is then bent around in a rectangle and one arm 14 of the wire is extended through the eye 13 and through the staples 11. Surrounding this arm 14 of the wire is a coiled spring 15, one end of which bears against the base as at 16, the other extending over one arm of the striker. Thus it will be seen that when the striker is drawn from the position shown in Figure 1 to that shown in Figure 2 the spring will be placed under tension.

For the purpose of holding the striker in a set or retracted position, I provide a combined trigger and locking member 17.

This may be made of thin metal and extends longitudinally of the base. At its forward end the metal is twisted so as to form a horizontally disposed plate 18 which in the form of the invention shown in Figure 1 is slitted to provide a tongue or prong 19 beneath which the bait may be fastened. The other end of the trigger 17 is angularly extended at 20, this portion 20 being disposed within a slot 21 formed in the base and being pivoted upon a staple 22 which passes through an opening in the portion 20 and has its ends in the end of the base. Any other suitable pivoting means may be used, however. The rear side of the portion 20 is formed to provide a downwardly and forwardly extending notch 23 and a finger piece or stop 24 having a rounded upper edge. The finger piece projects above the upper face of the base as shown in Figure 1 and when the finger piece is pressed downward, the latch will be raised and when pressure on the finger piece is released the latch will fall under its own weight.

When it is desired to set this trap, the striker 12 is retracted against the tension of the spring 15 and the finger piece is pressed downward until the wall or nose 23ª above the notch 23 extends over the cross bar of the striker as in Figure 2. Previous to this, of course, the bait has been applied to the plate 18 either by attaching the bait to the prong 19 or placing it beneath this prong. If now an animal attempts to get the bait, he will depress the plate 18 which will withdraw the nose 23ª from over the cross bar of the striker and the strain will then cause the striker to violently return to its unset position and strike the animal, breaking its back or otherwise killing it.

The animal will then be clamped between the base and the striker. This form of trap may also be set by retracting the striker and then inverting the trap whereupon the weight of the trigger 17 will cause it to take the position shown in Figure 2.

In Figure 4 I show a slightly modified form of my invention having a base 10, the staples 11, the striker 12 and the spring 15 all as previously described. The trigger, however, is modified so that it will release the striker when the trigger is raised instead of when the trigger is depressed. To this end the trigger 17ª at its rear end is formed with the portion 20ª extending into the slot 21ª as usual and pivoted as before described. This portion 20ª however, is formed with a downwardly and rearwardly extending notch 25, the rear wall 25ª of which extends upwardly and forwardly in a slight curve. The rear of the portion 20 is formed with the upwardly extending finger piece 26 analogous to the finger piece 24. The forward end of the trigger is formed with the plate 18ª which extends over a recess 27 formed in the base for the reception of the bait. In setting this trap, the finger piece 26 is depressed which retracts the trigger and then when the cross bar of the striker has been brought into the notch 25, pressure on the finger piece is released and the weight of the trigger will cause the nose 25ª to extend over the cross bar of the striker. Thus the trap is set. When the animal attempts to get at the bait, he will have to lift up on the plate 18ª which will release the trigger and the animal will be trapped in the manner heretofore described.

While I have heretofore referred to this trap being set by depressing the finger piece or limit piece 24, which acts as a stop or limit member to prevent the trigger from being turned upward any further than is necessary, it is obvious that the trap may be set with one hand as follows:—

The trap is grasped with the thumb extending slightly over the striker 12, the base of the forefinger resting on the spring 15 and the other fingers over the other end of the trap. Then the striking member 12 is raised carrying it over to engage in the notch 23. Then the thumb is slid over, ending by the thumb resting on the limit piece or stop 24 and the trap is set without complication. The trap may be set in the dark or without even looking at it.

In setting the trap shown in Figure 4, when the cross bar of the striker 12 is brought to setting position, its first strikes the inclined surface 25ª which forces the trigger 17 to tilt on its axis rearwardly and then the notch 25 is reached, the nose 25ª falls forward by gravity and is latched. In this type of trap, the finger piece 26 need not be used and in this case will act only as a limit stop to prevent the trigger from being turned upward any further than need be.

It will be noted that my trap contains elements which are commonly found in other traps of the same character, but that the improvement which I have added is the trigger 17 secured in place in the slot by the staple 22. I thus add only two more parts to an old form of trap and only one more movable member, yet obtain a trap which is simpler in construction and in operation, is positive in setting and in action, in which there is no possibility of any part getting misplaced, no complications and in which there is no danger of accidental snapping on the fingers in setting it for the reason that in the final operation of setting, the fingers are on the opposite end from the jaws.

In the ordinary trap of this character, the trigger is disposed in such position that if by any chance the trigger should be accidentally released while setting the trap, the striker would immediately swing over and strike the fingers of the hand. This is entirely obviated by this construction as there is no possibility of the fingers being struck in setting the trap as even if the striker 12 does fly over, it can not harm the fingers.

It is to be noted that the trigger 17 is formed with a strip of metal which is horizontally disposed at its forward end or free end to form a bait plate and then it twisted so that the rear portion of the trigger is disposed in a vertical plane and extends down through the relatively narrow slot 21, the rear portion of this trigger being relatively wide where it extends down through the slot. Thus by twisting the trigger in the manner shown, a very much lighter strip of material may be used to form the trigger without danger of its bending as would be the case were the trigger formed of a strip disposed entirely in a horizontal plane instead of having the greater portion of its length disposed in a vertical plane. Furthermore, my trigger has a relatively wide portion 20 at its rear end surrounding the pivot pin 22 and extending through the slot 21 affording a wide area for holding the trigger against lateral movement and holding the trigger against any side tilting movement.

Thus the relatively wide, rear portion 20 of the trigger performs three functions. It limits any lateral swinging movement of the trigger, it limits tilting movement of the trigger, and at the same time it provides for pivoting the trigger.

I claim:—

1. A trap of the character described comprising a base, a striker pivoted upon the base, a coiled spring operatively engaging the striker and urging the striker into one position, a trigger extending longitudinally of the base, the rear end of the trigger being angularly extended and the base being slotted to receive said angular extension, a pivot for the trigger intersecting the slot, the trigger at its rear end being formed with a notch defined on one side by a nose adapted to engage over the striker and hold it in set position, the trigger rearward of said notch being formed with an upwardly extending finger piece projecting upward through said slot and angularly bent at its upper end to form a limiting stop.

2. A trap of the character described, comprising a base, a striker pivoted upon the base, a coiled spring operatively engaging the striker and urging the striker into one position, a trigger extending longitudinally of the base and formed of a strip of metal, the free end of which is disposed in a horizontal plane, the rear portion of the strip being twisted relative to the free end portion and disposed in a vertical plane, the rear end of the trigger being angularly extended and the base being slotted to receive said angular extension, the angular extension being relatively large in area to thus resist lateral tilting or lateral swinging movement, a pivot for the trigger intersecting the slot, the trigger at its rear end being formed with a notch defined on one side by a nose to engage over the striker and hold it in said position.

In testimony whereof I hereunto affix my signature.

CAREY E. BUNKER.